July 16, 1935.  J. KOVANE  2,008,555
FISHING TACKLE
Filed Feb. 14, 1935
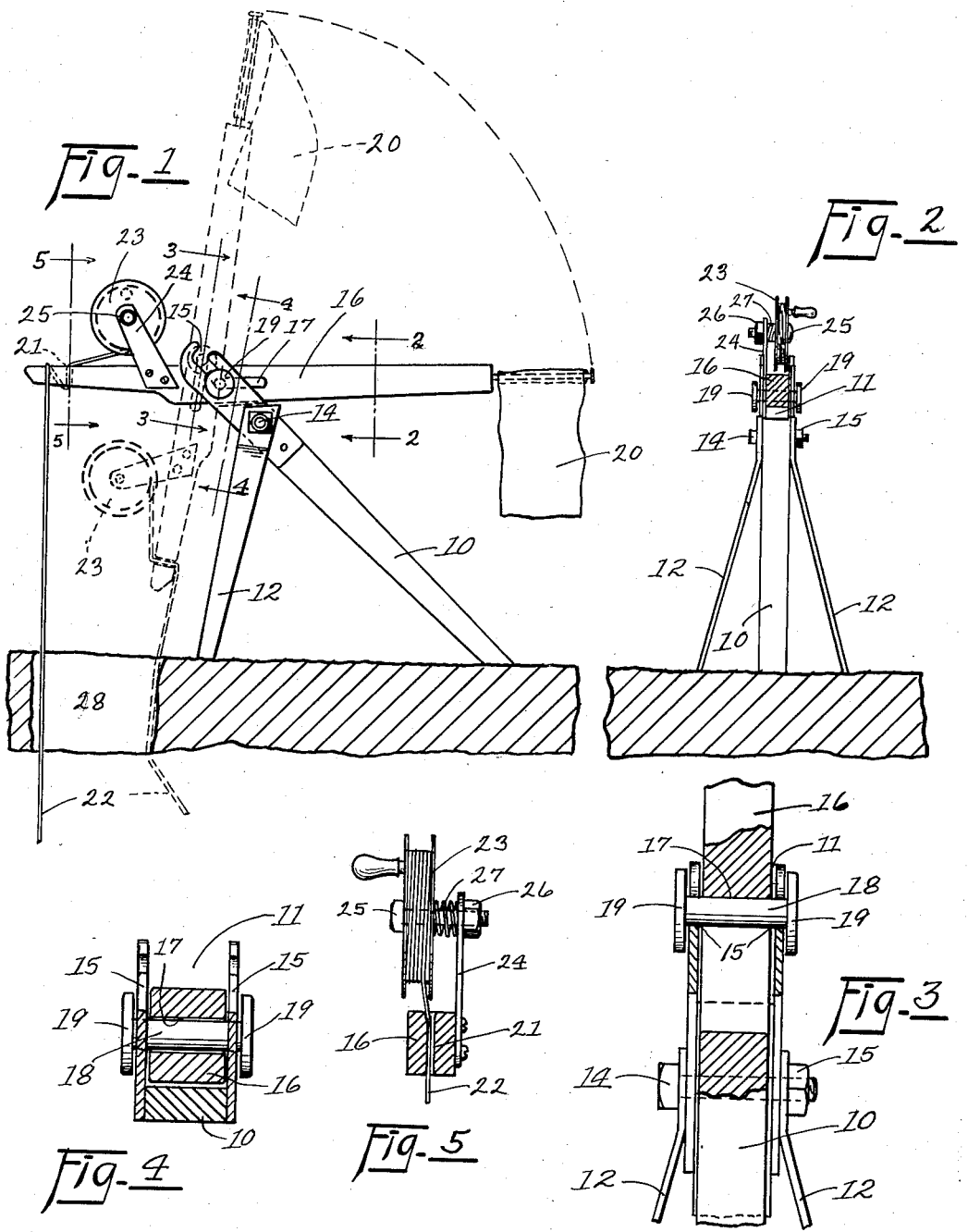
Witness:
Geo L. Chapel
Inventor
Jalmar Kovane
By Rice and Rice
Attorneys Patented July 16, 1935

2,008,555

UNITED STATES PATENT OFFICE 2,008,555

FISHING TACKLE

Jalmar Kovane, Flint, Mich.

Application February 14, 1935, Serial No. 6,448

11 Claims. (Cl. 43—16)

The instant invention relates to fishing tackle and more particularly to so-called "tip-up" fishing tackle.

The primary objects of the present invention are to provide fishing tackle which is particularly adapted for fishing through the ice; to provide fishing tackle of the character above indicated having a supporting arm adapted to tiltably support a signal arm in a normally substantially horizontal position which may be readily tipped into a substantially vertically suspended position when a fish strikes the bait; and, to provide novel fishing tackle of the general character above indicated which is effective in use and is economical in manufacture.

An illustrative embodiment of the invention is shown in the accompanying drawing, wherein:

Figure 1 is a side elevational view of the fishing tackle set up on the ice ready for use, showing the relative positions of the several parts thereof in full lines prior to a strike and showing the positions of the several parts in dotted lines after the fish seizes the bait;

Figure 2 is an end elevational sectional view thereof on line 2—2 of Figure 1;

Figure 3 is an enlarged sectional view on line 3—3 of Figure 1;

Figure 4 is an enlarged sectional view on line 4—4 of Figure 1; and

Figure 5 is an enlarged sectional view thereof on line 5—5 of Figure 1.

Referring then to the drawing in which like parts of the tackle are designated by the same numerals in the several views, a supporting arm 10 provided with a vertical slot 11 adjacent one end thereof and here shown as comprising a bifurcated end, is sustained in angularly adjusted position in its assembled relation by means of a pair of outwardly angularly disposed legs 12 which are pivotally adjustable with respect to their supported arm by means of the threaded bolt 13 and its nut 14.

The vertical bifurcated end of the supporting arm 10 is provided with a pair of oppositely disposed sockets 15 here shown as in the form of bayonet slots. The supporting arm 10 and its legs 12 may be made of any suitable material but are preferably of stamped metal.

A signal arm 16 of suitable material, likewise preferably of stamped metal, is provided with a longitudinal slot 17 therein disposed transversely of the vertical slot or bifurcated portion 11 and a pin 18 having disc ends 19 as best shown in Figure 3 is longitudinally slidable within the slot 17.

This pin is adapted to be seated within the sockets or bayonet slots 15 with its disc ends 19 adjacent the outer sides of the bifurcated portion of the supporting arm 10 whereby the signal arm 16 may be tiltably supported upon its supporting arm in a substantially horizontal position as shown in full lines in Figure 1 and tipped into a substantially vertically suspended position as indicated in dotted lines in the same figure.

One end of the signal arm 16 is here shown as provided with an indicator such as the flag 20 and the other end is provided with an aperture 21 through which a line 22 on the reel 23 may be passed. The reel is here shown as detachably secured to an angularly projecting finger 24 secured to the signal arm adjacent one of its ends by means of the threaded bolt 25 passing through the finger and its nut 26. A coil spring 27 preferably encircles the shank of the bolt interjacent the side wall of the reel and the inside surface of the finger as best shown in Figure 5 by adjustably tightening the nut upon its bolt, the spring tensionally controls the rotatability of the reel.

In operation, the signal arm 16 is tiltably supported in a substantially horizontal position on the supporting arm 10 with the line 22 passed through the hole 28 of the ice as best shown in full lines in Figure 1. The line is preferably wrapped once around the end of the signal arm as shown. When a fish strikes the bait on the hook (neither shown) and runs with the bait, the signal arm is caused to tip to the substantially vertically suspended position indicated in dotted lines in Figure 1. The fisherman is thus signalled by the tipped-up indicator flag and thereupon brings in his catch.

It will thus be seen that the novel "tip-up" fishing tackle herein shown and described may be readily assembled for use and dismantled for portability, is effective in use and is economical in manufacture.

While but one specific embodiment of this invention has been herein shown and described, it will be understood that numerous details of the construction shown may be altered or omitted without departing from the spirit of this invention as defined by the following claims.

I claim:

1. In a device of the class described, a supporting arm provided with a vertical slot adjacent one end thereof, said vertical slot having a pair of oppositely disposed sockets, a signal arm having a longitudinal slot therein disposed transversely of said vertical slot, and a member longitudinally slidable within said longitudinal slot adapted to be seated within said sockets whereby the signal arm may be tiltably supported upon said supporting arm in a substantially horizontal position and tipped into a substantially vertically suspended position.

2. In a device of the class described, a supporting arm provided with a vertical slot adjacent one end thereof, said vertical slot having a pair of oppositely disposed sockets, a signal arm having a longitudinal slot therein disposed transversely of said vertical slot, and a member longitudinally slidable within said longitudinal slot adapted to be seated within said sockets whereby the signal arm may be tiltably supported upon said supporting arm in a substantially horizontal position and tipped into a substantially vertically suspended position, said signal arm having a reel receiving means and being provided with an aperture therein through which the reel line may be passed.

3. In a device of the class described, a supporting arm provided with a vertical slot adjacent one end thereof, said vertical slot having a pair of oppositely disposed sockets, a signal arm having a longitudinal slot therein disposed transversely of said vertical slot, and a member longitudinally slidable within said longitudinal slot adapted to be seated within said sockets whereby the signal arm may be tiltably supported upon said supporting arm in a substantially horizontal position and tipped into a substantially vertically suspended position, said signal arm having an indicator at one end thereof and a reel and reel line aperture through which the line may be passed at the other end thereof.

4. In a device of the class described, an angularly disposed supporting arm provided with a vertical bifurcated portion at one end thereof, said bifurcated portion having a pair of oppositely disposed bayonet slots, a signal arm having a longitudinal slot therein disposed transversely of said vertical slot, and a disc ended pin longitudinally slidable within said longitudinal slot adapted to be seated within said bayonet slots whereby the signal arm may be tiltably supported upon said supporting arm in a substantially horizontal position and tipped into a substantially vertically suspended position.

5. In a device of the class described, an angularly disposed supporting arm provided with a vertical bifurcated portion at one end thereof, said bifurcated portion having a pair of oppositely disposed bayonet slots, a signal arm having a longitudinal slot therein disposed transversely of said vertical slot, and a disc ended pin longitudinally slidable within said longitudinal slot adapted to be seated within said bayonet slots whereby the signal arm may be tiltably supported upon said supporting arm in a substantially horizontal position and tipped into a substantially vertically suspended position, said signal arm having reel receiving means and being provided with an aperture therein through which the reel line may be passed.

6. In a device of the class described, an angularly disposed supporting arm provided with a vertical bifurcated portion at one end thereof, said bifurcated portion having a pair of oppositely disposed bayonet slots, a signal arm having a longitudinal slot therein disposed transversely of said vertical slot, and a disc ended pin longitudinally slidable within said longitudinal slot adapted to be seated within said bayonet slots whereby the signal arm may be tiltably supported upon said supporting arm in a substantially horizontal position and tipped into a substantially vertically suspended position, said signal arm having an indicator at one end thereof and a reel and reel line aperture through which the line may be passed at the other end thereof.

7. In a device of the class described, a supporting arm provided with a vertical slot adjacent one end thereof, means for sustaining the supporting arm in an angular position, said vertical slot having a pair of oppositely disposed sockets, a signal arm having a longitudinal slot therein disposed transversely of said vertical slot, and a member longitudinally slidable within said longitudinal slot adapted to be seated within said sockets whereby the signal arm may be tiltably supported upon said supporting arm in a substantially horizontal position and tipped into a substantially vertically suspended position.

8. In a device of the class described, a supporting arm provided with a vertical slot adjacent one end thereof, means for sustaining the supporting arm in an angular position comprising a pair of pivotally adjustably spaced legs, said vertical slot having a pair of oppositely disposed sockets, a signal arm having a longitudinal slot therein disposed transversely of said vertical slot, and a member longitudinally slidable within said longitudinal slot adapted to be seated within said sockets whereby the signal arm may be tiltably supported upon said supporting arm in a substantially horizontal position and tipped into a substantially vertically suspended position.

9. In a device of the class described, a supporting arm provided with a vertical bifurcated portion at one end thereof, means for sustaining the supporting arm in an angular position, said bifurcated portion having a pair of oppositely disposed bayonet slots, a signal arm having a longitudinal slot therein disposed transversely of said vertical slot, and a disc ended pin longitudinally slidable within said longitudinal slot adapted to be seated within said bayonet slots whereby the signal arm may be tiltably supported upon said supporting arm in a substantially horizontal position and tipped into a substantially vertically suspended position.

10. In a device of the class described, a supporting arm provided with a vertical bifurcated portion at one end thereof, means for sustaining the supporting arm in an angularly adjusted position comprising a pair of pivotally adjustably spaced legs, said bifurcated portion having a pair of oppositely disposed bayonet slots, a signal arm having a longitudinal slot therein disposed transversely of said vertical slot, and a disc ended pin longitudinally slidable within said longitudinal slot adapted to be seated within said bayonet slots whereby the signal arm may be tiltably supported upon said supporting arm in a substantially horizontal position and tipped into a substantially vertically suspended position.

11. In a device of the class described, a supporting arm provided with a vertical slot adjacent one end thereof, said vertical slot having a pair of oppositely disposed sockets, a signal arm having a longitudinal slot therein disposed transversely of said vertical slot, and a member longitudinally slidable within said longitudinal slot adapted to be seated within said sockets whereby the signal arm may be tiltably supported upon said supporting arm in a substantially horizontal position and tipped into a substantially vertically suspended position, said signal arm having a rotatable reel provided with tensioning means for adjustably controlling the rotatability of the reel.

JALMAR KOVANE.